Patented Nov. 4, 1924.

1,514,095

UNITED STATES PATENT OFFICE.

SVEN JOHAN NORDSTROM, OF SAN FRANCISCO, CALIFORNIA, ASSIGNOR, BY DIRECT AND MESNE ASSIGNMENTS, TO MERCO NORDSTROM VALVE COMPANY, OF SAN FRANCISCO, CALIFORNIA, A CORPORATION OF DELAWARE.

LUBRICANT.

No Drawing.   Application filed August 28, 1922. Serial No. 584,617.

*To all whom it may concern:*

Be it known that I, SVEN JOHAN NORDSTROM, a subject of the King of Sweden, and a resident of San Francisco, in the county of San Francisco and State of California, have invented certain new and useful Improvements in Lubricants, of which the following is a specification.

The invention relates to an improvement in lubricants.

It has been proposed heretofore to produce lubricants insoluble in gasoline. But so far as known, no lubricant insoluble in gasoline is on the market today or in common use. The object of the present invention is to produce a lubricant which will be insoluble or substantially insoluble in gasoline. To this end, the invention consists in the improved lubricant hereinafter described and particularly pointed out in the claim.

In preparing my improved lubricant I make a mixture of soda soap, potash soap, graphite and glycerine. An excellent soda soap for the purpose is flaked "Ivory" soap. Common green soap serves as the potash soap ingredient and the graphite is preferably in flake form. These ingredients are mixed together without heating in substantially the following proportions: Flaked Ivory soap 32%, green soap 52%, flake graphite 4%, and glycerine 12%. The ingredients are thoroughly mixed together and when the mixture is homogeneous throughout, it constitutes a lubricant which is ready for immediate use. The improved lubricant, as thus constituted, is applied by being extruded from grease cups, grease guns and the like, and is particularly suitable for use on plug cocks and other fittings in contact with gasoline.

Having thus described the invention what I claim as new is:—

A lubricant insoluble in gasoline consisting of a mixture of substantially 32% hard soap, 52% soft soap, 4% graphite and 12% glycerine.

SVEN JOHAN NORDSTROM.